United States Patent [19]

Mitsche

[11] 3,943,071

[45] Mar. 9, 1976

[54] METHOD OF MANUFACTURING A SPHEROIDAL REFORMING CATALYST

[75] Inventor: Roy T. Mitsche, Island Lake, Ill.

[73] Assignee: Universal Oil Products Company, Des Plaines, Ill.

[22] Filed: Oct. 15, 1974

[21] Appl. No.: 514,536

[52] U.S. Cl.............................. 252/448; 252/466 PT
[51] Int. Cl.$^2$. B01J 21/04; B01J 23/42; B01J 23/62
[58] Field of Search............... 252/448, 466 PT, 439

[56] References Cited
UNITED STATES PATENTS 3,740,328   6/1973   Rausch.......................... 252/466 PT Primary Examiner—W. J. Shine
Attorney, Agent, or Firm—James R. Hoatson, Jr.; Robert W. Welch; William H. Page, II

[57] ABSTRACT

A method of manufacturing a high surface area, spheroidal reforming catalyst comprising a tin-promoted, alumina-supported platinum group metal. A soluble tin compound and a finely divided eta-alumina are combined with an acidic alumina hydrosol, and the mixture thereafter converted to spheroidal particles by the oil-drop method. The spheroidal particles are subsequently impregnated with a platinum group metal component.

9 Claims, No Drawings

METHOD OF MANUFACTURING A SPHEROIDAL REFORMING CATALYST

The reforming of gasoline boiling range feed stocks to improve the octane rating thereof is a process well known to the petroleum industry. The feed stock may be a full boiling range gasoline fraction boiling in the 50°–425° F. range although it is more often what is commonly called naphtha — a gasoline fraction characterized by an initial boiling point of from about 150° to about 250° F. and an end boiling point of from about 350° to about 425° F.

The reforming of gasoline boiling range feed stocks is generally recognized as involving a number of octane-improving hydrocarbon conversion reactions requiring a multi-functional catalyst. In particular, the catalyst is designed to effect several octane-improving reactions with respect to paraffins and naphthenes — the feed stock components that offer the greatest potential for octane improvement. Thus, the catalyst is designed to effect isomerization, dehydrogenation, dehydrocyclization and hydrocracking of paraffins. Of these hydrocarbon conversion reactions, dehydrocyclization produces the greatest gain in octane value and is therefore a favored reaction. For naphthenes, the principal octane-improving reactions involve dehydrogenation and ring isomerization to yield aromatics of improved octane value. With most naphthenes being in the 65–80 F-1 clear octane range, the octane improvement, while substantial, is not as dramatic as in the case of the lower octane paraffins. Reforming operations thus employ a multi-functional catalyst designed to provide the most favorable balance between the aforementioned octane-improving reactions to yield a product of optimum octane value, said catalyst having at least one metallic dehydrogenation component and an acid-acting hydrocracking component.

However, even with the achievement of a desired balance between the octane-improving reactions, problems persist relating principally to undesirable side reactions which, althrough minimal, cumulatively contribute to carbon formation, catalyst instability and product loss. Thus, demethylation occurs with the formation of excess methane; excessive hydrocracking produces light gases; cleavage or ring opening of naphthenes results in the formation of low octane, straight chain hydrocarbons; condensation of aromatics forms coke precursors and carbonaceous deposits; and the acid catalyzed polymerization of olefins and other polymerizable materials yield high molecular weight hydrocarbons subject to dehydrogenation and further formation of carbonaceous matter.

Accordingly, an effective reforming operation is dependent on the proper selection of catalyst and process variables to minimize the affect of undesirable side reactions for a particular hydrocarbon feed stock. However, the selection is complicated by the fact that there is an interrelation between reaction conditions relating to undesirable side reactions and desirable octane-improving reactions, and reaction conditions selected to optimize a particular octane-improving reaction may, and often do, also promote one or more undesirable side reactions. For example, as previously indicated, some hydrocracking is desirable since it produces lower boiling hydrocarbons of higher octane value than the parent hydrocarbon. But hydrocracking of the lower boiling $C_6$–$C_8$ constituents is not desirable since it produces still lower boiling hydrocarbons, such as butane, which are of marginal utility. It is this type of hydrocracking that is referred to as excessive hydrocracking and to be avoided. The extent and kind of hydrocracking is controlled by careful regulation of the acid-acting component of the catalyst and by the use of low hydrogen partial pressures. The latter follows from the fact that the hydrocracking reaction consumes hydrogen and the reaction can therefore be controlled by limiting hydrogen concentrations in the reaction media. Low hydrogen partial pressures have a further advantage in that the main octane-improving reactions, i.e., dehydrogenation of paraffins and naphthenes, are net producers of hydrogen and, as such, favored by low hydrogen pressure.

Catalysts comprising a supported platinum group metal, for example, platinum supported on alumina, are widely known for their selectivity in the production of high octane aromatics, general activity with respect to each of the several octane-improving reactions which make up the reforming process, and for their stability at reforming conditions. One of the principal objections to low pressure reforming relates to its effect on catalyst stability. This steams from the fact that low pressure operation tends to favor the aforementioned condensation and polymerization reactions believed to be the principal reactions involved in the formation of coke precursors and carbon deposits so detrimental to catalyst stability.

More recently, the industry has turned to certain multi-component or multi-metallic catalysts comprising a platinum group metal component to make low pressure reforming, and all the advantages attendant therewith, a reality. In particular, a tin-promoted, alumina-supported platinum catalyst has been shown to be particularly effective low pressure reforming catalyst.

It is an object of this invention to present an improved catalyst particularly suitable for low pressure reforming and characterized by a novel method of manufacture. As will become apparent with reference to the following detailed specification, the catalyst composition of this invention comprises a platinum group metal component supported on a tincontaining alumina carrier material.

In one of its broad aspects, the present invention relates to a method of catalyst manufacture which comprises forming a mixture of a finely divided eta-alumina, an acidic alumina hydrosol, and a tin compound which is soluble therein, said eta-alumina being admixed with said hydrosol and said tin compound in an amount to provide from about 20 to about 50 wt. % of the final product; commingling the mixture with an ammonia precursor at below gelation temperature, said ammonia precursor being decomposable to ammonia with increasing temperature; dispersing the resultant mixture as droplets in a hot oil bath effecting decomposition of said ammonia precursor and formation of hydrogel spheres therein; aging the spheres at an elevated temperature effecting decomposition of the residual ammonia precursor contained therein, and washing, drying and calcining the aged spheres; and impregnating the calcined spheres with a platinum group metal component.

Other objects and embodiments of this invention will become apparent in the following detailed specification.

It is known that spheroidal catalyst particles offer enumerous advantages. When employed in a reaction or contact zone as a fixed bed, the spheroidal particles permit a more uniform packing and thereby minimize variations in pressure drop across the bed and the tendency of the reactant stream to channel through the bed out of effective contact with the catalyst. When employed in a moving bed type of operation, e.g., wherein the catalyst particles gravitate through a reaction zone, or are transported from one zone to another by the reactant stream or an extraneous carrying media, the spheroidal particles have a further advantage in that there are no sharp edges to errode or break off with the formation of fines which tend to plug process equipment.

The catalyst of this invention is manufactured as spheroidal particles by the method whereby an acidic alumina hydrosol is commingled with a gelling agent at below gelation temperature and the mixture dispersed as droplets in a water-immiscible suspending medium, usually a gas oil, maintained at an elevated temperature whereby the hydrosol droplets are formed into firm gel particles. The method, commonly referred to as the oil-drop method, is described by Hoekstra in U.S. Pat. No. 2,620,314. The method requires a gelling agent which has the ability to effect a progressive neutralization of the acidic hydrosol over a given time interval permitting the droplets to be drawn into spheres. Conventional gelling agents such as ammonium hydroxide are inoperable since they produce immediate gelation of the acidic hyrosol as a result of which spherical particles cannot be formed. In this regard, acceptable gelling agents include weak bases having a strong buffering action. An ammonia precursor such as hexamethylenetetramine, urea, or mixtures thereof, which is substantially stable at normal temperatures but decomposable or hydrolyzable to ammonia with increasing temperature, is suitably employed.

Pursuant to the present invention, a tin compound is solubilized in the acidic alumina hydrosol prior to gelation. Suitable tin compounds include stannous chloride, stannous bromide, stannous fluoride, stannic chloride, stannic fluoride, stannic iodine, stannic sulfate, stannic chloride trihydrate, stannic chloride tetrahydrate, stannic chloride pentahydrate, stannic chloride diamine, stannic chromate, stannic tartrate, and the like. Utilization of a tin halide, particularly stannous or stannic chloride, is preferable as it facilitates the incorporation of the tin component as well as halogen which has been recognized as a desirable component of reforming type catalyst. In some instances, it is desirable to add the tin compound to the hydrosol in solution with a halogen acid to obviate hydrolysis and premature precipitation of the tin component resulting ina non-uniform dispersion thereof in the fianl catalyst product. In any case, sufficient of the tin compound is employed to provide a final catalyst product containing from about 0.01 to about 5.0 wt. % tin, although it is within the scope of this invention to prepare catalysts containing up to about 30 wt. % tin. Regardless of the absolute amounts of the tin component and the platinum group metal utilized, the atom ratio of the platinum group metal to tin is preferably from about 0.1:1 to about 3:1, or more preferably from about 0.5:1 to about 1.5:1. This is particularly true when the total content of the tin component plus the platinum group metal component is in the range of from about 0.15 to about 2.0 wt. % of the final catalyst product.

In any case, the tin-containing alumina hydrosol is dispersed as droplets in the water-immiscible suspending media, generally at a temperature of from about 120° to about 220° F., with the formation of firm spheroidal gel particles. Typically, the particles are retained and aged in the hot oil suspending media for an extended period at a temperature of from about 120° to about 500° F. and at a pressure to maintain the water content thereof in a substantially liquid phase. During the aging process, the residual ammonia precursor continues to hydrolyze and further neutralize the spheroidal particles. The aging process is considered as essential to obviate excessive cracking and sphere disintegration during the subsequent water wash treatment for the separation of soluble salts. However, the practice also promotes the formation of crystalline boehmite alumina which, upon calcination at 370°–650° C., is invariably transformed into gamma-alumina.

While the structural formula of gamma-alumina is essentially the same as that of eta-alumina, the actual structures are substantially different. This is evidenced by the fact that gamma-alumina, produced by high temperature calcination of boehmite alumina, exhibits a surface area generally in the range of from about 160 to about 225 square meters per gram, while eta-alumina, produced by the high temperature calcination of bayerite alumina, has a surface area generally in the range of from about 250 to about 350 square meters per gram or more. Those skilled in the art of catalysis will recognize that an alumina with a surface area in the 250–350 square meter per gram range is more desirable than an alumina with a surface area in the 160–225 square meter per gram range. The former possesses a higher intrinsic activity as well as a greater tendency to retain catalytic activators, such as halogen, during processing.

Therefore, in the further practice of the method of this invention, a finely divided eta-alumina is dispersed and suspended in the aforementioned acidic alumina hydrosol prior to gelation, and the tin compound and the finely divided eta-alumina may be combined with the acidic hydrosol simultaneously or in any desired sequence. The expression "finely divided" is intended as descriptive of particles having an average diameter of less than about 150 microns, for example, particles which are recoverable through a 105 micron microsieve. In accordance with the present invention, the eta-alumina is admixed with the acidic hydrosol to provide from about 20 to about 50 wt. % of the final catalyst product. One preferred method of admixing the eta-alumina with the hydrosol is to prepare the eta-alumina as an aqueous slurry and add the same to the hydrosol slowly and with stirring.

The acidic alumina hydrosol employed herein is such as is prepared by the general method whereby a suitable acid salt of aluminum, such as aluminum chloride, is subjected to hydrolysis in aqueous solution and the solution treated at conditions to reduce the acid anion content thereof, as by neutralization, to achieve an aluminum/acid anion ratio of from about 1:1 to about 1.5:1. Thus, the reduction in acid anion concentration promotes olation of the hydrolysis product and the formation of alumina polymers of colloidal dimension dispersed and suspended in the remaining liquid. Reduction in the acid anion concentration can be effected in any conventional or otherwise convenient manner. For example, the acid anion concentration can be reduced utilizing aluminum metal as a neutralizing agent. In this case, the salt of neutralization is an aluminum salt subject to hydrolysis and ultimate sol formation. In some cases, as in the case of aluminum acetate, where the acid anion is sufficiently volatile, the desired acid anion deficiency may be created simply by heating. Another method of producing a suitable alumina hydrosol is in the electrolysis of an aluminum salt solution, for example an aqueous aluminum chloride solution, in an electrolytic cell having a porous partition between anode and cathode whereby an acid anion deficiency is effected in the cathode compartment with the formation of an alumina hydrosol therein.

Preferably, the acidic alumina hydrosol is an aluminum chloride hydrosol variously referred to as an aluminum oxychloride hydrosol, aluminum hydroxychloride hydrosol, and the like, such as is formed utilizing aluminum metal as a neutralizing agent in conjunction with an aqueous aluminum chloride solution. The aluminum chloride hydrosol is typically prepared by digesting aluminum in aqueous hydrochloric acid and/or aluminum chloride solution at about reflux temperature, usually from about 175° to about 220° F., and reducing the chloride anion concentration of the resulting aluminum chloride solution by the device of maintaining an excess of aluminum reactant in the reaction mixture as a neutralizing agent. In any case, the aluminum chloride hydrosol is prepared to contain aluminum in from about a 1:1 to about a 1.5:1 ratio with the chloride anion content thereof.

After the aforementioned aging treatment, the spheres are washed in any suitable manner. A particularly satisfactory method is to wash the spheres by percolation, either with an upward or downward flow of water, and preferably with water containing a small amount of ammonium hydroxide and/or ammonium nitrate. After washing, the spheres may be dried at a temperature of from about 200° to about 600° F. for 2 to 24 hours or more, or dried at this temperature and calcined at a temperature of from about 800° to about 1400° F. for 2 to 12 hours or more. It is preferred that the spheres be dried slowly and also that the drying be effected in a humid atmosphere since this has been found to result in less breakage of the spheres.

Although the present invention is directed to the manufacture of catalysts containing a platinum group metal, i.e. platinum, palladium, rhodium, ruthenium, osmium and iridium, platinum is a preferred catalyst component. Preferably, the calcined spheres are impregnated with from about 0.1 to about 1.0 wt. % platinum. The platinum group metal component is incorporated in the catalyst composite utilizing impregnating techniques known to the art. For example, the calcined spheres are suspended, dipped, or otherwise immersed in an aqueous solution of a soluble platinum group metal compound. Suitable compounds include platinum chloride, chloroplatinic acid, ammonium chloroplatinate, dinitrodiamino platinum, palladium chloride, chloropalladic acid, and the like. Utilization of a platinum group metal combined with halogen, such as chloroplatinic acid, is preferred as it facilitates the incorporation of the platinum group metal component as well as a halogen component. Hydrogen chloride is also generally added to the impregnating solution to further facilitate the incorporation of both the platinum group metal and a halogen component in the catalyst composite. The calcined spheres are preferably maintained in contact with the impregnating solution at ambient temperature conditions for a brief period, preferably for at least about 30 minutes, and the impregnating solution thereafter evaporated substantially to dryness. For example, a volume of calcined spheres is immersed in a substantially equal volume of impregnating solution in a steam jacketed rotary dryer and tumbled therein for a brief period at about room temperature. Steam is thereafter applied to the dryer jacket to expedite evaporation of the impregnating solution and recovery of substantially dry impregnated material. Following impregnation, the resulting impregnated material is subjected to a high temperature calcination or oxidation technique hereinafter described.

The final catalyst composite generally will be dried at a temperature of from about 200° to about 600° F. over a period of from about 2 to about 24 hours or more, and finally calcined at a temperature of from about 700° to about 1100° F. in an oxygen-containing atmosphere such as air for a period of from about 0.5 to about 10 hours in order to convert metallic components substantially to the oxide form. In the case where a halogen component is utilized in the catalyst, best results are generally obtained when the halogen content of the catalyst is adjusted during the calcination step by including a halogen or a halogen-containing compound in the air atmosphere utilized. In particular, when the halogen component of a catalyst is chlorine, it is preferred to use a mole ratio of $H_2O:HCl$ of from about 20:1 to about 100:1 during at least a portion of the calcination step in order to adjust the final chloride content of the catalyst in the range of from about 0.5 to about 1.2 wt. %.

Although not essential, it is preferred that the resultant calcined catalytic composite be subjected to a substantially water-free reduction step prior to its use in the conversion of hydrocarbons. The step is designed to insure a uniform and finely divided dispersion of the metallic components throughout the catalyst. Preferably, substantially pure and dry hydrogen (i.e., less than 20 volume ppm $H_2O$) is used as the reducing agent in this step. The reducing agent is contacted with the calcined catalyst at a temperature of from about 800° to about 1200° F. and for a period of from about 0.5 to about 10 hours or more effective to substantially reduce both metallic components to their elemental state. This reduction treatment may be performed in situ as part of a start-up sequence if precautions are taken to predry the plant to a substantially water-free state and if substantially water-free hydrogen is used.

The reduced catalytic composite may, in some cases, be beneficially subjected to a presulfiding operation designed to incorporate in the catalytic composite from about 0.05 to about 0.50 wt. % sulfur. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide having about 10 moles of hydrogen per mole of hydrogen sulfide, at conditions sufficient to effect the desired incorporation of sulfur, generally including a temperature ranging from about 50° to about 1100° F. or more. It is generally a good practice to perform this presulfiding step under substantially water-free conditions.

Reforming of gasoline feed stocks in contact with the catalyst of this invention as herein contemplated, is suitably effected under an imposed pressure of from about 100 to about 1000 psig and at a temperature of from about 800° to about 1100° F. The hydrogen rich gas, principally a recycle gas comprising in excess of about 80% hydrogen, is admixed with the hydrocarbon charge stock to provide a hydrogen/hydrocarbon mole ratio of from about 2 to about 20. The hydrocarbon charge stock in admixture with hydrogen is generally preheated to the desired reaction temperature and passed into contact with the catalyst contained in the reaction zone. The hydrocarbon charge stock is passed in contact with the catalyst at a liquid hourly space velocity (LHSV) of from about 0.5 to about 10, an LHSV of from about 1.0 to about 4.0 being preferred. The reaction zone effluent is recovered in a high pressure — low temperature receiver or separator whereby a hydrogen-rich gaseous phase is separated and recycled, in part, to the reaction zone in admixture with the hydrocarbon charge thereto.

Although the catalyst of this invention is particularly suitable for reforming, it may be used to promote other reactions including dehydrogenation of specific hydrocarbons or hydrocarbon fractions, isomerization of specific hydrocarbons or hydrocarbon fractions, destructive hydrogenation or hydrocracking of larger hydrocarbon molecules such as those occurring in the kerosine and gas oil boiling range, and the oxidation of hydrocarbons to produce first, second, and third stage oxidation products. Reaction conditions employed in the various hydrocarbon conversion reactions are those heretofore practiced in the art. For example, alkyl aromatic isomerization reaction conditions include a temperature of from about 32° to about 1000° F., a pressure of from about atmospheric to about 1500 psig, a hydrogen to hydrocarbon mole ratio of from about 0.5:1 to about 20:1, and a LHSV of from about 0.5 to about 20. Likewise, typical hydrocracking reaction conditions include a pressure of from about 500 psig to about 3000 psig, a temperature of from about 390° to about 935° F., a LHSV of from about 0.1 to about 10, and a hydrogen circulation rate of from about 1000 to about 10,000 SCF/BBL (standard cubic feet per barrel of charge).

The following example is presented in illustration of the method of this invention and is not intended as an undue limitation on the generally broad scope of the invention as set out in the appended claims.

EXAMPLE

An amount of stannic chloride, calculated to provide about 0.5 wt. % tin in the final catalyst product, is dissolved in an acidic alumina hydrosol prepared by digesting aluminum pellets in hydrochloric acid at about 215° F. while maintaining an excess of the aluminum reactant in the reaction mixture. During the digestion process, the reaction mixture is stirred until sufficient aluminum is digested to yield a hydrosol containing about 14.2 wt. % aluminum in a 1.15:1 atom ratio with the chloride anion content thereof. Thereafter, an alumina comprising 75% eta-alumina and having a surface area of 421 square meters per gram is ground to a fine powder and amixed with the hydrosol as an aqueous slurry in an amount to provide about 25 wt. % of the final catalyst product. The 28% aqueous hexamethylenetetramine solution is then admixed with the hydrosol and the mixture dispersed as droplets in a hot (194° F.) oil bath to form spheroidal gel particles. Sufficient of the hexamethylenetetramine solution is employed to provide 125% neutralization of the sol chloride upon total decomposition. The spheroidal particles are aged overnight in the hot oil bath, washed with dilute ammoniacal solution, and oven dried at about 392° F. The dried particles are then heated to about 1200° F. and calcined for 2 hours at this temperature in air containing about 3% water. About 350 cubic centimeters of the calcined spheres are immersed in an equal volume of impregnating solution containing 131 cubic centimeters of aqueous chloroplatinic acid (10 mg of Pt/cc) and 8.4 cubic centimeters of hydrochloric acid. The solution is evaporated to dryness utilizing a rotary steam evaporator, and the dried spheres calcined at 300° F. in air for 1 hour and at 975° F. in air for 1 hour. The calcined particles are then reduced by passing a stream of substantially pure hydrogen containing less than about 20 volume ppm $H_2O$ over the particles at a gaseous hourly space velocity of about 720 and at a temperature of about 1025° F. for a 1 hour period. The reduced particles are then sulfided at conditions substantially identical to those used in the reduction step utilizing a substantially water-free stream of $H_2S$ and hydrogen in about a 10:1 mole ratio.

I claim as my invention:

1. A method of catalyst manufacture which comprises:
   a. forming a mixture of a finely divided etaalumina, an acidic alumina hydrosol, and a tin compound which is soluble therein and thermally decomposable to tin oxide, said eta-alumina being admixed with said hydrosol and said tin compound in an amount to provide from about 20 to about 50 wt. % of the final product;
   b. commingling the mixture with an ammonia precursor at below gelation temperature, said ammonia precursor being selected from the group consisting of hexamethylenetetramine, urea and mixtures thereof;
   c. dispersing the resultant mixture as droplets in a hot oil bath effecting decomposition of said ammonia precursor and the formation of hydrogel spheres therein;
   d. aging the spheres at an elevated temperature effecting decomposition of the residual ammonia precursor contained therein and promoting the formation of crystalline boehmite alumina, washing and drying the aged spheres and calcining at 370°– 650° C. to transform boehmite alumina into gamma-alumina; and
   e. impregnating the calcined spheres with a platinum group metal acid or salt, drying and calcining.

2. The method of claim 1 further characterized with respect to step (a) in that said acidic alumina hydrosol is an aluminum chloride hydrosol containing aluminum in from about a 1:1 to about a 1.5:1 ratio with the chloride anion content thereof.

3. The method of claim 1 further characterized with respect to step (a) in that said tin compound is stannic chloride.

4. The method of claim 1 further characterized with respect to step (a) in that said tin compound is employed in an amount to provide a final product containing from about 0.01 to about 5.0 wt. % tin.

5. The method of claim 1 further characterized with respect to step (b) in that said ammonia precursor is hexamethylenetetramine utilized in an amount to provide substantially complete neutralization of the acid anion content of said mixture.

6. The method of claim 1 further characterized with respect to step (c) in that said hot oil bath is at a temperature of from about 120° to about 220° F.

7. The method of claim 1 further characterized with respect to step (d) in that said spheres are aged at a temperature of from about 120° to about 500° F. and at a pressure to maintain the water content thereof in a substantially liquid phase.

8. The method of claim 1 further characterized with respect to step (e) in that said calcined spheres are impregnated with from about 0.1 to about 1.0 wt. % platinum.

9. The method of claim 1 further characterized in that a reducing treatment consisting of a reducing agent and a temperature of 800° to 1200° F for a period of 0.5 to 10 hours follows step (e).

* * * * *